(12) United States Patent
Evans (10) Patent No.: US 10,036,140 B2
(45) Date of Patent: Jul. 31, 2018

(54) TRACK ASSEMBLY OF MACHINE

(71) Applicant: Caterpillar Inc., Peoria, IL (US)

(72) Inventor: Ben Evans, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 55 days.

(21) Appl. No.: 15/373,588

(22) Filed: Dec. 9, 2016

(65) Prior Publication Data

US 2018/0163369 A1 Jun. 14, 2018

(51) Int. Cl.
*E02F 9/02* (2006.01)
*E02F 3/84* (2006.01)
*B62D 55/06* (2006.01)
*E02F 3/76* (2006.01)
*B62D 55/08* (2006.01)

(52) U.S. Cl.
CPC ............... *E02F 9/02* (2013.01); *B62D 55/06* (2013.01); *B62D 55/08* (2013.01); *E02F 3/7609* (2013.01); *E02F 3/844* (2013.01)

(58) Field of Classification Search
CPC ....... E02F 9/02; E02F 3/76; E02F 3/84; E02F 7/02; E02F 3/7609; E02F 3/844; B62D 55/06; B62D 55/08; B62D 55/065
See application file for complete search history.

(56) References Cited

U.S. PATENT DOCUMENTS

| | | | |
|---|---|---|---|
| 1,592,654 A | 7/1926 | Bremer | |
| 4,932,831 A * | 6/1990 | White | B25J 5/005 180/2.1 |
| 7,891,446 B2 | 2/2011 | Couture et al. | |
| 8,007,221 B1 | 8/2011 | More et al. | |
| 8,434,576 B1 * | 5/2013 | Ferguson | B62D 55/065 180/14.2 |
| 2006/0152081 A1 * | 7/2006 | Delisle | B62D 55/065 305/185 |
| 2007/0194540 A1 * | 8/2007 | Caspi | B62B 5/02 280/5.22 |
| 2008/0179115 A1 * | 7/2008 | Ohm | B25J 5/005 180/9.21 |
| 2011/0240382 A1 * | 10/2011 | Gettings | B62D 55/075 180/9.1 |
| 2015/0210327 A1 * | 7/2015 | Wolf | B62D 55/084 180/9.28 |

FOREIGN PATENT DOCUMENTS

| | | | |
|---|---|---|---|
| CA | 2946369 A1 * | 11/2015 | ............. B62K 25/20 |
| CN | 103158797 | 6/2013 | |
| GB | 250829 | 4/1926 | |
| JP | 2016055663 | 4/2016 | |

* cited by examiner

Primary Examiner — John Weiss (57) ABSTRACT

A track assembly of a machine having a pair of parallel main tracks is provided. The pair of parallel main tracks is mounted to a chassis for supporting the machine on a ground surface. Each of the pair of parallel main tracks includes a first end portion and a second end portion coupled to the first end portion. The second end portion is proximate, with respect to the first end portion, to an earth moving tool coupled to a frame of the machine. The second end portion is adapted to pivot about the first end portion. The track assembly further includes an actuation system coupling the frame with the earth moving tool, such that a movement of the actuation system to operate the earth moving tool translates into a pivoting movement of the second end portion for moving the second end portion with respect to the ground surface.

17 Claims, 5 Drawing Sheets

TRACK ASSEMBLY OF MACHINE

TECHNICAL FIELD

The present disclosure relates to tracked machines, and more particularly to a track assembly and a machine having the track assembly.

BACKGROUND

Construction machines, such as track-type tractors, hydraulic excavators, and hydraulic mining shovels usually have a pair of track assemblies as ground engaging members. Such track assemblies may include a pair of tracks, each track having a number of track shoes arranged around a fixed track frame, on either side of a machine for supporting the weight of the machine and payload, and providing traction in a variety of conditions. For a given drive force, the traction of the machine is limited by a ground contact surface area of the tracks and a ground pressure acting between the tracks and the ground surface. In applications such as dozing, drilling, and pile driving, when a tool fixed to a front end of the machine is applied to the ground surface, a rear end of the machine experiences more ground pressure in comparison to the front end causing imbalanced loading on the tracks. In applications such as ripping, towed scraping and levelling, when the tool is applied to the ground surface behind the machine, the rear end of the machine is unevenly loaded compared to the front end and therefore, experiences a lower ground pressure. Such uneven loading of the track assemblies can lead to premature wear and reduced traction.

Further, in order to operate the tool, the weight of the machine may be used to apply a pressure on the tool. The pressure on the tool may be dependent on the weight of the machine and the ground pressure on the tracks. In order to increase the pressure, the traction may be increased by increasing the payload on the machine. However, increasing the payload on the machine just to increase the traction is not always a feasible solution. Often, the pressure on the tool is also increased by adding weight to the tool or applying extra force to the tool through hydraulic cylinders or another similar mechanism. Increasing the pressure on the tool in this manner creates uneven loading in the track assembly, reduces the ground pressure under the tracks adjacent to work tool, and in turn limits the available traction.

Chinese Patent No. 103158797A (hereinafter the '797 patent), shows an underwater unmanned remote-control heavy-load work vehicle. The vehicle comprises a frame, a first walking caterpillar band, a second walking caterpillar band, an electronic cabin, a hydraulic valve cabin, a hydraulic pump station cabin, a right swing arm auxiliary caterpillar band and a right swing arm auxiliary caterpillar band. Two ends of a left swing arm auxiliary caterpillar band driving oil cylinder and a right swing arm auxiliary caterpillar band driving oil cylinder are respectively hinged on the frame and a left swing arm auxiliary caterpillar band support frame of the left swing arm auxiliary caterpillar band and a right swing arm auxiliary caterpillar band support frame of the right swing arm auxiliary caterpillar band on corresponding sides. The hydraulic oil cylinders are used to drive the triangular auxiliary caterpillar bands to swing, moving ranges are big, underwater work is easy to carry out, a structure is simple, weight is light, installation and maintenance are easy and convenient, and cost is saved. The oil cylinders are easy to lock, good in rigidity, and capable of carrying out underwater heavy-load work. By adopting a hydraulic oil cylinder swing arm driving system, the trafficability and the obstacle climbing ability of the underwater unmanned remote-control heavy-load work vehicle under complex environments are greatly improved, and the adaptability of the underwater unmanned remote-control heavy-load work vehicle in the seabed underwater complex environments is greatly enhanced. The underwater unmanned remote-control heavy-load work vehicle disclosed by the '797 patent does not disclose a track assembly having a pivotable portion.

SUMMARY OF THE DISCLOSURE

In one embodiment of the present disclosure, a track assembly of a machine is provided. The track assembly includes a pair of parallel main tracks, mounted to a chassis, for supporting the machine on a ground surface. Each of the pair of parallel main tracks includes a first end portion and a second end portion coupled to the first end portion. The second end portion is proximate, with respect to the first end portion, to an earth moving tool coupled to a frame of the machine. The second end portion is adapted to pivot about the first end portion. The track assembly further includes an actuation system coupling the frame with the earth moving tool, such that a movement of the actuation system to operate the earth moving tool translates into a pivoting movement of the second end portion for moving the second end portion with respect to the ground surface.

In another embodiment of the present disclosure, a track assembly of a machine is provided. The track assembly includes a pair of parallel main tracks, mounted to a chassis, for supporting the machine on a ground surface. Each of the pair of parallel main tracks includes a first end portion and an intermediate portion having a first end and a second end. The first end is coupled to the first end portion. Each of the pair of parallel main tracks further includes a second end portion coupled to the second end of the intermediate portion. The first end portion and the second end portion are adapted to pivot about the intermediate portion such that the first end portion and the second end portion move with respect to the ground surface, based on a proximity of the first end portion and the second end portion to an earth moving tool coupled to a frame of the machine.

In yet another embodiment of the present disclosure, a machine is provided. The machine includes a frame, a tool coupled to the frame, and a track assembly coupled to the frame. The tool is adapted to perform earth moving operations. The track assembly includes a primary track frame, a secondary track frame pivotably coupled to the primary track frame, an actuation system coupled to the secondary track frame and the tool, and a set of track shoes adapted to support the machine on a ground surface. The actuation system is adapted to selectively actuate to pivot the secondary track frame with respect to the primary track frame.

Other features and embodiments of this disclosure will be apparent from the following description and the accompanying drawings.

DETAILED DESCRIPTION

Figure 1:
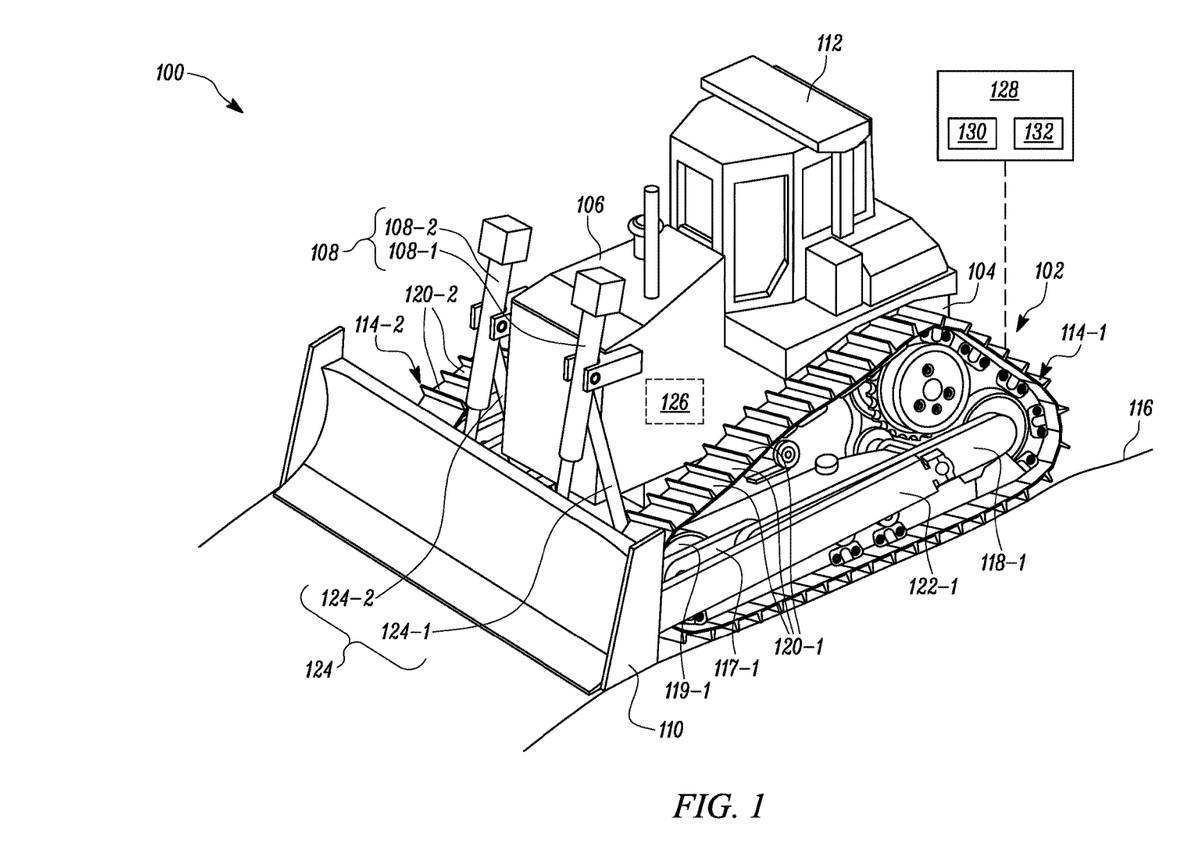
FIG. 1 is a perspective view of a machine having a track assembly, according to one embodiment of the present disclosure.
Figure 2:
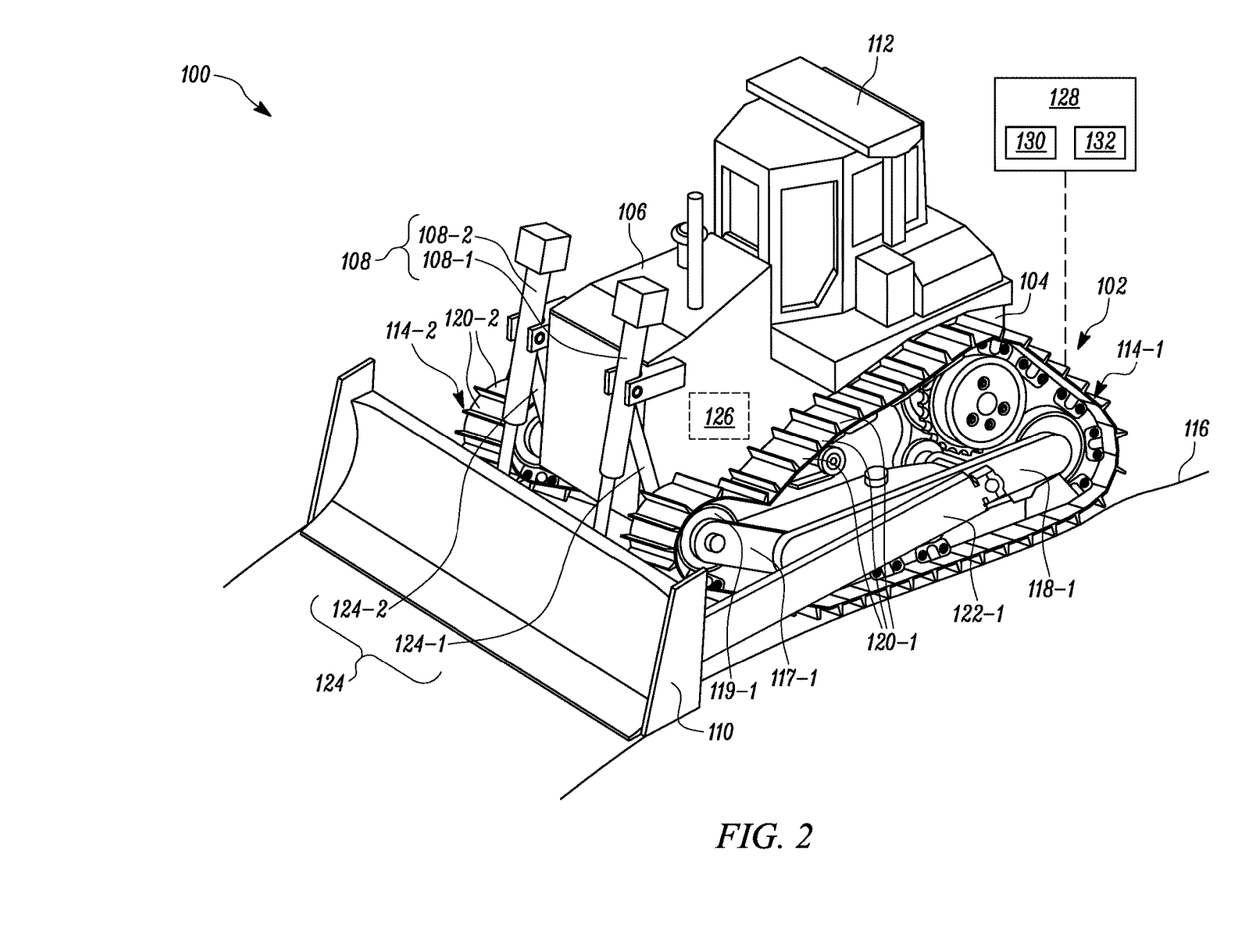
FIG. 2 is another perspective view of the machine of FIG. 1, according to one embodiment of the present disclosure.

Wherever possible, the same reference numbers will be used throughout the drawings to refer to the same or the like parts. FIG. 1 and FIG. 2 illustrate perspective views of a machine 100 having a track assembly 102, according to one embodiment of the present disclosure. Referring to FIG. 1 and FIG. 2, in the present embodiment, the machine 100 is shown to be a track-type tractor. In other embodiments, the machine 100 may include, but is not limited to, a hydraulic excavator, a hydraulic mining shovel, a wheel loader, a motor grader, a pipe layer, and a backhoe, without departing from the scope of the present disclosure.

The machine 100 may include a chassis 104, a frame 106 mounted on the chassis 104, the track assembly 102 coupled to the frame 106 and mounted on the chassis 104, an actuation system 108 coupled to the frame 106, a tool 110 coupled to the actuation system 108, and an operator station 112. In one embodiment, the track assembly 102 may include a pair of parallel main tracks 114, hereinafter referred to as main tracks 114, adapted to support the machine 100 on a ground surface 116, for example, during stationary operations and to move the machine 100 on the ground surface 116. The main tracks 114 may also be adapted to uniformly distribute a load of the machine 100 on the ground surface 116.

In the illustrated embodiment, the main tracks 114 are individually referred to as a main track 114-1 and a main track 114-2. The main track 114-1 and the main track 114-2 may respectively be mounted on a first end (not shown) and a second end (not shown) of the chassis 104. The main track 114-1 may include a stationary frame 118-1, a frame portion 117-1 pivotably coupled to the stationary frame 118-1, and a plurality of track shoes 120-1 mounted on the stationary frame 118-1 and the frame portion 117-1. The stationary frame 118-1 and the frame portion 117-1 may also be referred to as a primary track frame 118-1 and a secondary track frame 117-1, respectively. The main track 114-1 may further include a sprocket 119-1 connected with the frame portion 117-1.

The main track 114-2 may include a stationary frame 118-2 (shown in FIG. 3), a frame portion 117-2 pivotably connected to the stationary frame 118-2, and a plurality of track shoes 120-2 mounted on the stationary frame 118-2 and the frame portion 117-2. The main track 114-2 may further include a sprocket 119-2 connected with the frame portion 117-2. The stationary frame 118-2 and the frame portion 117-2 may also be referred to as a primary track frame 118-2 and a secondary track frame 117-2, respectively.

The stationary frame 118-1 and the stationary frame 118-2 may hereinafter be collectively referred to as stationary frames 118. The track shoes 120-1 and the track shoes 120-2 may hereinafter be collectively referred to as a set of track shoes 120 or track shoes 120. Further, the frame portion 117-1 and the frame portion 117-2 may hereinafter be collectively referred to as frame portions 117, and the sprocket 119-1 and the sprocket 119-2 may hereinafter be collectively referred to as sprockets 119. The constructional and operational features of the track assembly 102 are explained in further detail in the description of FIG. 3 and FIG. 4.

In one embodiment, the machine 100 may include a pair of linkage systems 122 adapted to couple the stationary frames 118 to the tool 110. In particular, the machine 100 may include a linkage system 122-1 to couple the stationary frame 118-1 with the tool 110. Similarly, the machine 100 may include a linkage system (not shown) to couple the stationary frame 118-2 with the tool 110. Each of the pair of linkage systems 122 may be coupled to the corresponding stationary frame 118 in a pivotable manner. Therefore, the pair of linkage systems 122 may move to perform a pivotable movement for enabling the tool 110 to move with respect to the stationary frames 118.

Further, the machine 100 may include the actuation system 108 adapted to couple the frame 106 with the tool 110. In one embodiment, the actuation system 108 may include a pair of hydraulic actuators 108, individually referred to as a hydraulic actuator 108-1 and a hydraulic actuator 108-2, for controlling the movement of the tool 110. The machine 100 may further include a hydraulic pump (not shown) adapted to provide pressurized hydraulic fluid to the hydraulic actuators 108 through a plurality of hoses (not shown) for operating the tool 110.

In one embodiment, the movement of the tool 110 may depend on the operation of the machine 100. For example, the tool 110 may move in a forward direction and a backward direction. In another example, the tool 110 may move in an upward direction and a downward direction. In one embodiment, the tool 110 may be adapted to perform earth moving operations. In the present embodiment, the tool 110 may be a blade assembly. In one embodiment, the tool 110 may interchangeably be referred to as an earth moving tool 110, without departing from the scope of the present disclosure.

In one embodiment, the machine 100 may also include a pair of connecting systems 124, hereinafter referred to as connecting systems 124, adapted to couple the main tracks 114 with the actuation system 108. In the present embodiment, the machine 100 may include a connecting system 124-1 adapted to couple the main track 114-1 with the hydraulic actuator 108-1. Further, the machine 100 may include a connecting system 124-2 adapted to couple the main track 114-2 with the hydraulic actuator 108-2. In one embodiment, the connecting systems 124 may be adapted to couple the frame portions 117 with the actuation system 108. Therefore, the actuation system 108 may be coupled to the frame portions 117 and the tool 110. In one embodiment, the actuation system 108 may be pivotably coupled to the tool 110.

In one embodiment, the machine 100 may include a slippage control system 128 in communication with the track assembly 102. The slippage control system 128 may include a sensing unit 130 and a controller 132 in communication with the sensing unit 130. The sensing unit 130 may be adapted to detect and communicate a slippage of the main tracks 114 to the controller 132. Based on the slippage of the main tracks 114, the controller 132 may be adapted to move the frame portions 117 to increase or decrease contact with the ground surface 116.

In one embodiment, the machine 100 may include a rear attachment (not shown). In one example, the rear attachment may be a ripper assembly. In other embodiments, the rear attachment may include, but is not limited to, a winch assembly and a drawbar assembly. In such as embodiment, the machine 100 may further include another actuation system 108 at a rear end of the machine 100 for coupling the rear attachment with the machine 100. In one embodiment, the rear attachment may include, but is not limited to, a fixed parallelogram linkage configuration and a variable parallelogram linkage configuration.

The machine 100 may also include an engine (not shown) enclosed in an engine compartment 126 to provide power to a main drive system (not shown) and the actuation system 108 for operating the track assembly 102 and the tool 110, respectively. Further, the operator station 112 may accommodate an operator to control operations of the machine 100. The operator station 112 may include a number of control equipment (not shown) to control the operations of the machine 100.

Figure 3:
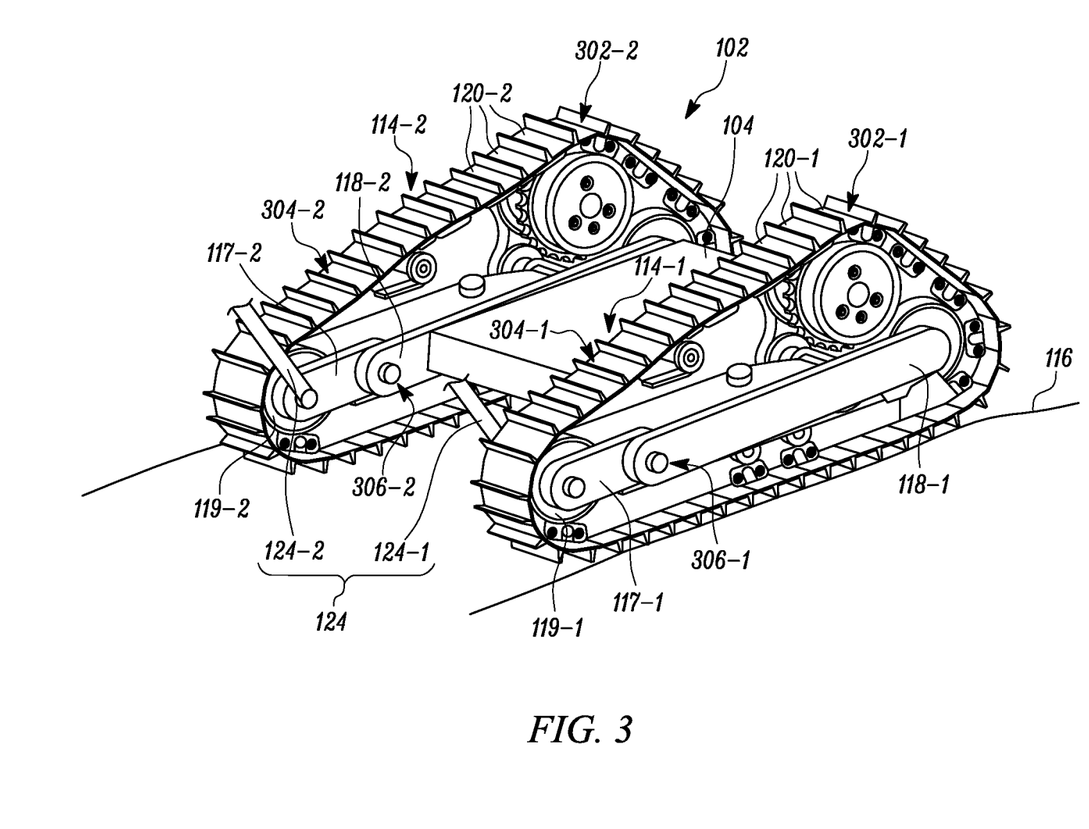
FIG. 3 is a perspective view of the track assembly, according to one embodiment of the present disclosure.

FIG. 3 illustrates a perspective view of the track assembly 102, according to one embodiment of the present disclosure. In one embodiment, each of the main tracks 114 may include a first end portion 302 and a second end portion 304 coupled to the first end portion 302. In particular, the main track 114-1 may include a first end portion 302-1 and a second end portion 304-1. The first end portion 302-1 may include, but is not limited to, the stationary frame 118-1 and the track shoes 120-1 mounted on the stationary frame 118-1. Further, the second end portion 304-1 may include, but is not limited to, the frame portion 117-1 and the track shoes 120-1 mounted on the frame portion 117-1.

Similarly, the main track 114-2 may include a first end portion 302-2 and a second end portion 304-2. The first end portion 302-2 may include, but is not limited to, the stationary frame 118-2 and the track shoes 120-2 mounted on the stationary frame 118-2. Further, the second end portion 304-2 may include, but is not limited to, the frame portion 117-2 and the track shoes 120-2 mounted on the frame portion 117-2.

In one embodiment, the first end portion 302-1 and the first end portion 302-2 may hereinafter be collectively referred to as first end portions 302. Similarly, the second end portion 304-1 and the second end portion 304-2 may hereinafter be collectively referred to as second end portions 304.

For the sake of brevity, the description of the track assembly 102 is explained with respect to the main track 114-1. However, it should be appreciated by a person skilled in the art that the description of the main track 114-1 is equally applicable to the main track 114-2, without departing from the scope of the present disclosure.

Referring to the main track 114-1, with respect to the first end portion 302-1, the second end portion 304-1 may be proximate to the tool 110. Further, the second end portion 304-1 may be coupled to the first end portion 302-1 such that the second end portion 304-1 may be adapted to pivot about the first end portion 302-1. By pivoting about the first end portion 302-1, the second end portion 304-1 may move with respect to the ground surface 116. In one embodiment, the pivoting of the second end portion 304-1 with respect to the first end portion 302-1 may cause a portion of the track assembly 102, in particular, the main track 114-1 to lose contact with the ground surface 116. In one embodiment, an angle of pivot of the second end portion 304-1 may be about 5 degrees. In one embodiment, the angle of pivot may vary based on the detection of slippage of the main track 114-1 by the slippage control system 128. For example, based on the detection of the slippage, the controller 132 may reduce the angle of pivot so that the second end portion 304-1 may move to be in contact with the ground surface 116.

In one embodiment, in response to the movement of the second end portion 304-1 with respect to the ground surface 116, a load acting on the second end portion 304-1 may be transferred to the tool 110 through the connecting system 124-1. In one example, the load acting on the second end portion 304-1 may be 20% of an overall load acting on the first end portion 302-1 and the second end portion 304-1. Therefore, when the second end portion 304-1 is moved with respect to the ground surface 116, 20% of the overall load may be transferred to the tool 110 through the connecting system 124-1. In another embodiment, in response to the movement of the second end portion 304-1 with respect to the ground surface 116, the load acting on the second end portion 304-1 may be transferred to both the tool 110 and the first end portion 302-1.

In one embodiment, for coupling the second end portions 304 with the corresponding first end portions 302, the track assembly 102 may include pivoting mechanisms 306. In particular, the track assembly 102 may include a pivoting mechanism 306-1 adapted to couple the second end portion 304-1 with the first end portion 302-1 of the main track 114-1. Similarly, the track assembly 102 may include a pivoting mechanism 306-2 adapted to couple the second end portion 304-2 with the first end portion 302-2 of the main track 114-2.

In another embodiment, the frame portions 117 may move relative to the stationary frame 118 in a non-pivoting manner. For example, the frame portions 117 may move in an upward direction or an inward direction in order to reduce the effective ground contact area under the track assembly 102.

In one embodiment, the pivoting mechanisms 306 may include roller pivots, or a pair of bushing-type pivoting mechanisms 306 for coupling the second end portions 304 with the corresponding first end portions 302. In another embodiment, the pivoting mechanisms 306 may include a pair of bearing-type pivoting mechanisms 306 for coupling the second end portions 304 with the corresponding first end portions 302.

Figure 4:
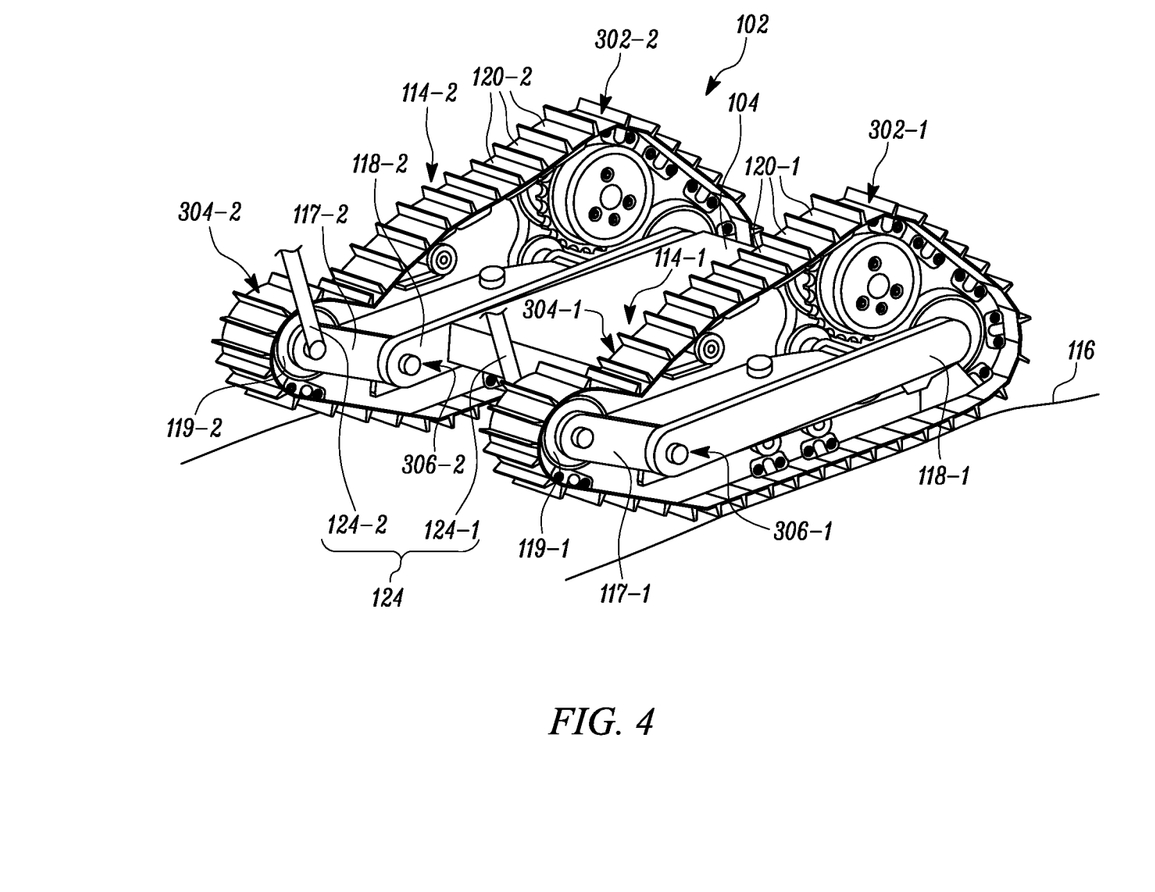
FIG. 4 is a perspective view of the track assembly, according to one embodiment of the present disclosure.

FIG. 4 illustrates a perspective view of the track assembly 102, according to one embodiment of the present disclosure. In FIG. 4, the second end portions 304 of the track assembly 102 are shown to be moved with respect to the ground surface 116, corresponding to position shown in FIG. 2. As shown, the second end portion 304-1 of the main track 114-1 and the second end portion 304-2 of the main track 114-2 may be pivoted about the first end portion 302-1 and the first end portion 302-2 by the pivoting mechanism 306-1 and the pivoting mechanism 306-2, respectively.

Referring to FIG. 1, FIG. 2, FIG. 3, and FIG. 4, the main tracks 114 may be coupled to the actuation system 108 through the connecting systems 124. In particular, the connecting systems 124 may be adapted to couple the second end portions 304 of the main tracks 114 to the actuation system 108 adapted to control the movement of the tool 110. As shown, the connecting system 124-1 may be adapted to couple the second end portion 304-1 to the hydraulic actuator 108-1. Further, the connecting system 124-2 may be adapted to couple the second end portion 304-2 to the hydraulic actuator 108-2.

In one embodiment, through the connecting system 124-1, the second end portion 304-1 may be coupled to the hydraulic actuator 108-1 such that a movement of the hydraulic actuator 108-1 to operate the tool 110 may translate into a pivoting movement of the second end portion 304-1. Consequently, the pivoting movement of the second end portion 304-1 may move the second end portion 304-1 with respect to the ground surface 116. Therefore, the actuation system 108 may be selectively actuated to pivot the second end portion 304-1 with respect to the first end portion 302-1.

Figure 5:
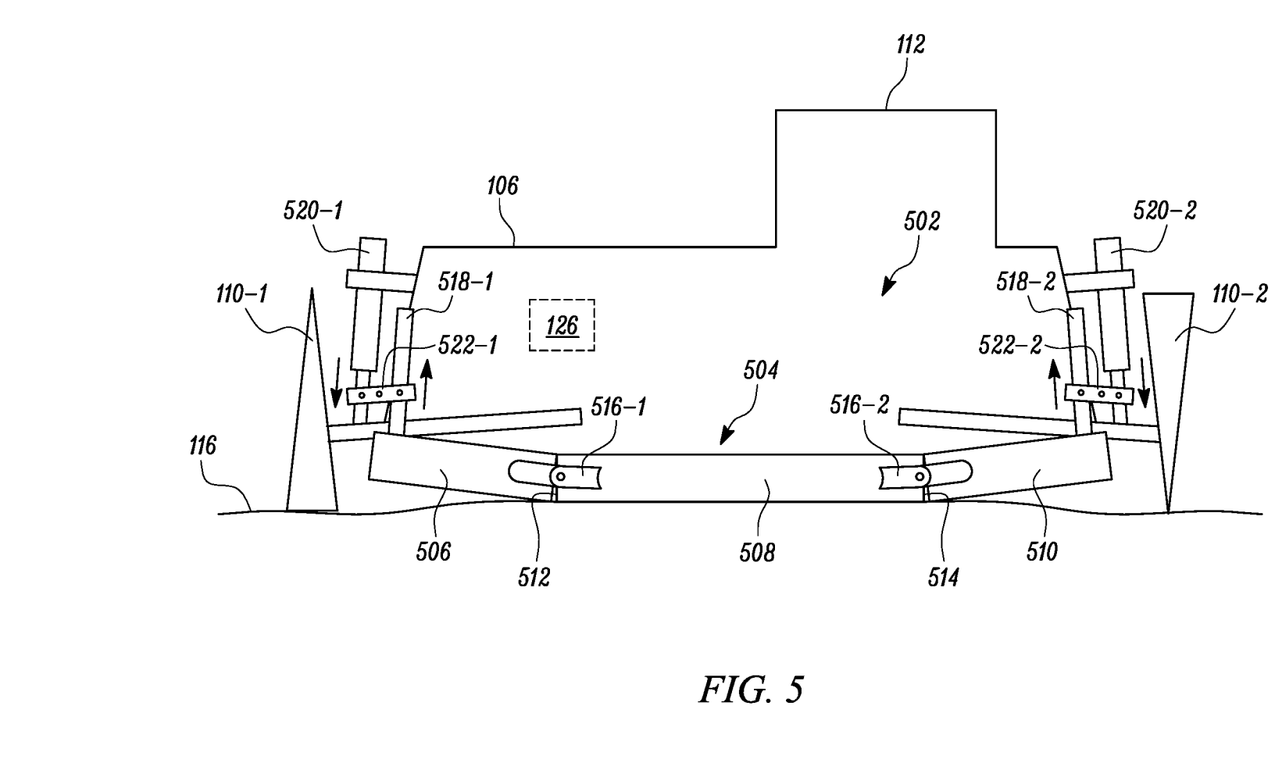
FIG. 5 is a schematic view of a track assembly, according to another embodiment of the present disclosure.

FIG. 5 illustrates a side schematic view of a track assembly 502, according to another embodiment of the present disclosure. In one embodiment, the track assembly 502 may replace the track assembly 102 of the machine 100. In such an embodiment, the track assembly 502 may include a pair of parallel main tracks 504 mounted on the chassis 104. The main tracks 504 may be adapted to support the machine 100 on the ground surface 116. In the illustrated embodiment, the track assembly 502 may be explained collectively for the pair of parallel main tracks 504.

Each of the main tracks 504 may include a first end portion 506, an intermediate portion 508 coupled to the first end portion 506, and a second end portion 510 coupled to the intermediate portion 508. In one embodiment, the intermediate portion 508 may include a first end 512 and a second end 514, and the first end 512 may be coupled to the first end portion 506. Further, the second end 514 may be coupled to the second end portion 510. In one embodiment, the first end portion 506 and the second end portion 510 may be adapted to pivot about the intermediate portion 508. By pivoting about the intermediate portion 508, the first end portion 506 and the second end portion 510 may be adapted to move with respect to the ground surface 116. In one embodiment, the first end portion 506 and the second end portion 510 may move with respect to the ground surface 116, based on proximity of the first end portion 506 and the second end portion 510 to the tool 110.

In one embodiment, when a distance between the tool 110 and the first end portion 506 is less than a distance between the tool 110 and the second end portion 510, the first end portion 506 may move with respect to the ground surface 116 by pivoting about the intermediate portion 508. In another embodiment, when the distance between the tool 110 and the second end portion 510 is less than the distance between the tool 110 and the first end portion 506, the second end portion 510 may move with respect to the ground surface 116 by pivoting about the intermediate portion 508. In yet another embodiment, the first end portion 506 as well as the second end portion 510 may move with respect to the ground surface 116 by pivoting about the intermediate portion 508, for example, when the machine 100 may include multiple tools 110, such as a tool 110-1 and a tool 110-2. In an example, the tool 110-1 may be a blade assembly, and the tool 110-2 may be a ripper assembly.

In one embodiment, the first end portion 506 and the second end portion 510 may pivot about the intermediate portion 508 through pivoting mechanisms 516. The track assembly 502 may include a pivoting mechanism 516-1 and a pivoting mechanism 516-2 adapted to couple the first end portion 506 and the second end portion 510 to the intermediate portion 508, respectively. In one embodiment, the track assembly 502 may include a pair of bushing-type pivoting mechanisms 516 for coupling the intermediate portion 508 with the first end portion 506 and the second end portion 510 of the main track 504. In another embodiment, the track assembly 502 may include a pair of bearing-type pivoting mechanisms 516 for coupling the intermediate portion 508 with the first end portion 506 and the second end portion 510 of the main track 504.

In one embodiment, the machine 100 may include connecting systems 518 adapted to couple the main tracks 504 with actuation systems 520. The connecting systems 518 may be adapted to couple either the first end portions 506 or the second end portions 510 of the main tracks 504 to the actuation systems 520. For illustration purposes, the connecting systems 518 are shown as connecting systems 518-1 and connecting systems 518-2. Similarly, the actuation systems 520 are shown as an actuation system 520-1 and an actuation system 520-2.

In one embodiment where the tool 110 is closer to the first end portions 506 than the second end portions 510, the connecting systems 518-1 may be adapted to couple the first end portions 506 to the actuation system 520-1. In another embodiment where the tool 110 is closer to the second end portions 510 than the first end portions 506, the connecting systems 518-2 may be adapted to couple the second end portions 510 to the actuation system 520-2.

As shown, the connecting systems 518 may be coupled to the actuation systems 520 through connectors 522 disposed horizontally with respect to the connecting systems 518 and the actuation systems 520. In particular, the connecting systems 518-1 may be coupled to the actuation system 520-1 through connectors 522-1. The connectors 522-1 may be adapted to accommodate an upward movement of the connecting systems 518-1 in response to a downward movement of the actuation system 520-1 in order to move the tool 110-1 towards the ground surface 116. Further, the connectors 522-1 may be adapted to accommodate a downward movement of the connecting systems 518-1 in response to an upward movement of the actuation system 520-1 in order to move the tool 110-1 away from the ground surface 116. Similarly, the connecting systems 518-2 may be coupled to the actuation system 520-2 through connectors 522-2.

Therefore, through the connection systems 518, one of the first end portion 506 and the second end portion 510 may be coupled to the hydraulic actuators 520 such that a movement of the hydraulic actuators 520 to operate the tool 110 may translate into a pivoting movement of one of the first end portion 506 and the second end portion 510. Consequently, the pivoting movement of one of the first end portion 506 and the second end portion 510 may move the first end portion 506 and the second end portion 510 with respect to the ground surface 116, respectively.

In one embodiment, when the first end portion 506 is moved with respect to the ground surface 116, the load acting on the first end portion 506 may be transferred to the tool 110-1 through the connecting system 518-1. In another embodiment, when the first end portion 506 is moved with respect to the ground surface 116, the load acting on the first end portion 506 may be transferred to the tool 110-1, the intermediate portion 508, and the second end portion 510. Further, when the second end portion 510 is moved with respect to the ground surface 116, the load acting on the second end portion 510 may be transferred to the tool 110-2 through the connecting system 518-2. In another embodiment, when the second end portion 510 is moved with respect to the ground surface 116, the load acting on the second end portion 510 may be transferred to the tool 110-2, the intermediate portion 508, and the first end portion 506.

In one embodiment, the track assembly 102 and the track assembly 502 may collectively be referred to as track assemblies 102, 502. The main tracks 114 and the main tracks 504 may collectively be referred to as main tracks 114, 504. The first end portions 302 and the first end portions 506 may collectively be referred to as first end portions 302, 506. Similarly, the second end portions 304 and the second end portions 510 may collectively be referred to as second end portions 304, 510. The connecting system 124 and the connecting system 518 may collectively be referred to as connecting systems 124, 518. The actuation system 108 and the actuation system 520 may collectively be referred to as actuation systems 108, 520.

INDUSTRIAL APPLICABILITY

The present disclosure relates to the track assembly 102, the track assembly 502, and the machine 100 having one of the track assembly 102 and the track assembly 502. Although the present disclosure is explained with regard to the machine 100 being the track-type tractor, the track assembly 102 and the track assembly 502 may be included in any other machine from any industry having tracks as ground engaging members.

The track assemblies 102, 502 and the machine 100 having one of the track assemblies 102, 502 of the present disclosure offer a comprehensive approach for ensuring increased loading on the tool 110 as well as an effective load distribution on the track assemblies 102, 502 during the operation of the machine 100. Due to the pivoting movement, one of the first end portions 302, 506 and the second end portions 304, 510 may be adapted to move with respect to the ground surface 116. The angle of pivot for the first end portions 302, 506 and the second end portions 304, 510 may be selected such that the pivoting movement can be accommodated by an already existing tensioning system of the track assemblies 102, 502. Therefore, the track assemblies 102, 502 achieve the pivoting functionality by making minimal modification to an already existing construction.

In one embodiment, a portion of the track assemblies 102, 502 closer to the tool 110 is pivotable. In another embodiment, portions of the track assemblies 102, 502 at both ends of the track assemblies 102, 502 are pivotable with respect to the intermediate portion 508. As a result, irrespective of the position of the tool 110 which may change based on an operation, the track assemblies 102, 502 have the functionality of pivotability. Therefore, the track assemblies 102, 502 of the present disclosure offer flexibility in terms of implementation and usage.

Further, the first end portions 302, 506 and the second end portions 304, 510 are connected to the actuation systems 108, 520 through the connecting systems 124, 518. In order to operate the tool 110, the actuation systems 108, 520 applies a downward pressure on the tool 110, and simultaneously movably tilts the first end portions 302, 506 or the second end portions 304, 510 by a proportional amount. Therefore, the first end portions 302, 506 or the second end portions 304, 510 are moved with respect to the ground surface 116 (as shown in FIG. 3) in synchronization with the operation of the tool 110. The load acting on the portion of the main tracks 114, 504 which is moved with respect to the ground surface 116, i.e., the first end portions 302, 506 or the second end portions 304, 510, is transferred to the tool 110 resulting in an effective operation of the tool 110. By transferring a proportion of the machine weight through the actuation systems 108, 520 to the tool 110, useful work is added to the tool 110, and the load is uniformly distributed on a portion of the track assemblies 102, 502 which is contact with the ground surface 116, without additional machine weight or hydraulic work.

Moreover, the pivoting movement of the first end portions 302, 506 and the second end portions 304, 510 ensures a redistribution of the load across a portion of the main tracks 114, 504 that is in contact with the ground surface 116. As a result, a ground pressure on the stationary portion of the main tracks 114, 504 is increased leading to an increase in traction between the machine 100 and the ground surface 116. Therefore, the machine 100 remains stable when the tool 110 is operating, for example, during dozing operations and ripping operations. As a result, the machine 100 with a less weight can be used for the same operation. In addition, the pivoting movement of the first end portions 302, 506 and the second end portions 304, 510 may be controlled based on the slippage of the main tracks 114, 504. Once the slippage of the main tracks 114, 504 is detected, a length of the track assemblies 102, 502 in contact with the ground surface 116 may be increased by reducing the angle of pivot which in turn would lead to reduction of the pressure on the tool 110, resulting in a temporarily increase in the traction. Therefore, the present disclosure offers the track assemblies 102, 502 and the machine 100 having the track assemblies 102, 502 that are simple, effective, economical, and flexible.

While aspects of the present disclosure have been particularly shown and described with reference to the implementations above, it will be understood by those skilled in the art that various additional implementations may be contemplated by the modification of the disclosed machines, systems and methods without departing from the spirit and scope of what is disclosed. Such implementations should be understood to fall within the scope of the present disclosure as determined based upon the claims and any equivalents thereof.

What is claimed is:

1. A track assembly of a machine comprising:
   a pair of parallel main tracks, mounted to a chassis, for supporting the machine on a ground surface, each of the pair of parallel main tracks comprising;
   a first end portion, and
   a second end portion coupled to the first end portion, the second end portion being proximate, with respect to the first end portion, to an earth moving tool coupled to a frame of the machine, wherein the second end portion is adapted to pivot about the first end portion; and
   an actuation system coupling the frame with the earth moving tool, such that a movement of the actuation system to operate the earth moving tool translates into a pivoting movement of the second end portion for moving the second end portion with respect to the ground surface.

2. The track assembly of claim 1, further comprising a pair of connecting systems adapted to couple the pair of parallel main tracks with the actuation system.

3. The track assembly of claim 2, wherein a load acting on the second end portion is transferred to the earth moving tool through one of the pair of connecting systems, in response to the movement of the second end portion from the ground surface.

4. The track assembly of claim 2, wherein a load acting on the second end portion is transferred to the first end portion and the earth moving tool, in response to the movement of the second end portion from the ground surface.

5. The track assembly of claim 1, further comprising a bushing-type pivoting mechanism for coupling the second end portion to the first end portion.

6. The track assembly of claim 1, further comprising a bearing-type pivoting mechanism for coupling the second end portion to the first end portion.

7. A track assembly of a machine comprising:
   a pair of parallel main tracks, mounted to a chassis, for supporting the machine on a ground surface, each of the pair of parallel main tracks comprising:
   a first end portion;
   an intermediate portion having a first end and a second end, wherein the first end is coupled to the first end portion; and
   a second end portion coupled to the second end of the intermediate portion, wherein the first end portion and the second end portion are adapted to pivot about the intermediate portion such that the first end portion and the second end portion move with respect to the ground surface, based on a proximity of the first end portion and the second end portion to an earth moving tool coupled to a frame of the machine.

8. The track assembly of claim 7, wherein one of the first end portion and the second end portion is coupled to an actuation system coupling the frame with the earth moving tool, such that a movement of the actuation system to operate the earth moving tool translates into a pivoting movement of one of the first end portion and the second end portion, respectively, for moving the second end portion with respect to the ground surface.

9. The track assembly of claim 8, further comprising a pair of connecting systems adapted to couple the pair of parallel main tracks with the actuation system.

10. The track assembly of claim 7, further comprising a pair of bushing-type pivoting mechanisms for coupling the intermediate portion with the first end portion and the second end portion.

11. The track assembly of claim 7, further comprising a pair of bearing-type pivoting mechanisms for coupling the intermediate portion with the first end portion and the second end portion.

12. A machine comprising:
a frame;
a tool, coupled to the frame, adapted to perform earth moving operations; and
a track assembly, coupled to the frame, comprising:
a primary track frame;
a secondary track frame pivotably coupled to the primary track frame;
an actuation system coupled to the secondary track frame and the tool, wherein the actuation system selectively actuates to pivot the secondary track frame with respect to the primary track frame; and
a set of track shoes adapted to support the machine on a ground surface.

13. The machine of claim 12, wherein the actuation system is pivotably coupled to the tool.

14. The machine of claim 12, wherein the pivoting of the secondary track frame with respect to the primary track frame causes a portion of the track assembly to lose contact with the ground surface.

15. The machine of claim 12, further comprising a slippage control system in communication with the track assembly, the slippage control system comprising:
a sensing unit adapted to detect a slippage of the set of track shoes; and
a controller, in communication with the sensing unit, adapted to move the second end portion to be in contact with the ground surface, based on the slippage of the set of track shoes.

16. The machine of claim 12, wherein the track assembly further comprises a bushing-type pivoting mechanism for coupling the primary track frame to the secondary track frame.

17. The machine of claim 12, wherein the track assembly further comprises a bearing-type pivoting mechanism for coupling the primary track frame to the secondary track frame.

* * * * *